United States Patent [19]

Martin

[11] Patent Number: 5,418,032
[45] Date of Patent: May 23, 1995

[54] VEHICLE INTERIOR DOOR PANEL

[75] Inventor: Robert J. Martin, Adrian, Mich.

[73] Assignee: General Motors Corporation, Detroit, Mich.

[21] Appl. No.: 161,491

[22] Filed: Dec. 6, 1993

[51] Int. Cl.$^6$ .................. B32B 1/04; D03D 3/00
[52] U.S. Cl. .................. 428/71; 428/172; 428/174; 428/192; 428/233; 428/245; 428/246; 428/284; 428/287; 428/317.1; 428/318.8; 428/481; 428/537.5
[58] Field of Search .............. 428/156, 172, 68, 72, 428/74, 95, 141, 161, 174, 233, 245, 246, 284, 287, 481, 537.5, 317.1, 192, 318.8

[56] References Cited

U.S. PATENT DOCUMENTS

| | | | |
|---|---|---|---|
| 4,102,721 | 7/1978 | Carey, Jr. ............................ | 156/79 |
| 4,323,406 | 4/1982 | Morello .............................. | 156/91 |
| 4,529,639 | 7/1985 | Peoples, Jr. et al. ................ | 428/95 |
| 4,737,226 | 4/1988 | Inoue .................................. | 156/245 |
| 4,781,956 | 11/1988 | Zimmermann et al. ............ | 428/43 |
| 4,810,452 | 3/1989 | Taillefert et al. ................... | 264/247 |
| 4,874,448 | 10/1989 | Urai ..................................... | 156/196 |
| 5,037,591 | 8/1991 | Rohrlach et al. ................... | 264/46.5 |
| 5,073,318 | 12/1991 | Rohrlach et al. ................... | 264/46.5 |

*Primary Examiner*—Donald J. Loney
*Attorney, Agent, or Firm*—Ernest E. Helms

[57] ABSTRACT

An interior panel for an automotive vehicle is providing including a generally rigid plastic panel; a backing material formed into a membrane and attached with the rigid plastic panel; a polyester pad providing a cushioning surface and being adjacent to the backing material opposite the plastic panel; a cloth membrane insert covering a portion of the pad and having at least one major edge; an adhesive insert placed on the cloth membrane insert generally adjacent the major edge; and a supported vinyl membrane covering a portion of the pad not covered by the cloth insert, the vinyl membrane having a portion overlapping the adhesive insert and the cloth insert, the backing material, the pad, the cloth membrane insert, the adhesive insert and the vinyl membrane being dielectrically joined to one another adjacent the major edge of the cloth membrane insert.

2 Claims, 1 Drawing Sheet

VEHICLE INTERIOR DOOR PANEL

FIELD OF THE INVENTION

The field of the present invention is that of interior trim components, especially door panels for automotive vehicles.

BACKGROUND OF THE INVENTION

Many automotive interior door panels are molded to have a two-tone texture color appearance. Typically, there is a main surface covering the entire panel which is covered with a first cover of vinyl. Located within the interior of the panel is often an insert covered with an alternative color of cloth material. The cloth insert and vinyl material typically will also have underneath some type of foam or fiber padding to make the interior of the door panel soft to the touch. One method to obtain a two-tone texture color appearance is shown and described in co-pending patent application Ser. No. 08/041,109 to Stein et al, commonly assigned. The Stein et al method requires a molding operation.

An alternative to the Stein et al process which does not require a molding process is to prepare a door panel covered in vinyl and then to achieve the two-tone effect by gluing the cloth insert to the vinyl. Still another method of achieving the two-tone texture appearance is to first attach the cloth insert to a cardboard platform and then, by gluing or by some type of fasteners, attach the cloth insert to the door panel. The gluing or fastening method of attaching the cloth insert to the door panel is technically acceptable. However, from a labor standpoint, the gluing or fastening method is not desirable.

Still another process of attaching a cloth insert to a vinyl-covered interior door panel is the dielectric tear seal process. In the tear seal process, the cloth insert is positioned on the padding. The vinyl is placed over the cloth insert and the remainder of the door panel. The padding, cloth insert and vinyl are dielectrically bonded together along the edges of their interface between the cloth insert and the vinyl. At the same time that the dielectric press joins the vinyl to the cloth, the press also serrates the vinyl so that it may later be torn away, hence the term tear seal is given to the process.

The tear seal process offers four major disadvantages. The first disadvantage of the tear seal process is that two steps are involved, namely the joining of the vinyl to the cloth insert (and to its underlying padding) and a second process which requires the vinyl which had been serrated by the dielectric tool to be torn away. The above is a two-step process and requires the expense of the second operation. Additionally, the torn-away portion of the vinyl increases scrap cost and disposal cost for associated refuse.

The second disadvantage of the tear seal process is that if the serrating or tear process is not totally accurate, the door panel will have to be scrapped due to the unsightly appearance where the vinyl is torn.

Thirdly, the cutting serrations on the dielectric tool dies cause the tool to have sharp edges. The sharp edges required on this type of dielectric tool die attract the energy from the high voltage field required in the dielectric process generating sparks, thereby mandating high maintenance rams on the dielectric tools.

The fourth major disadvantage of the tear seal process is that it can only utilize an unsupported vinyl (a supported vinyl has a fabric reinforcement) since the vinyl has to stick with the cloth insert material. Therefore, the door panel does not exhibit the superior wear characteristics of a door panel that utilizes a supported vinyl.

Prior attempts to dielectrically manufacture a door panel insert with a cloth lower trim and a supported vinyl upper trim failed due to the lack of control over part alignment, adequate adhesion between the supported vinyl and the cloth insert, and the raw edge treatment to process out the exposed supported vinyl strings.

SUMMARY OF THE INVENTION

To provide an alternative to a two-tone door panel which is manufactured with the tear seal process, which minimizes subsequent trim operations and which allows the use of a supported vinyl, the present invention is brought forth. The present invention provides an interior automotive door trim panel having a hard plastic foundation. A backing, foundation, dielectric padding and a cloth insert are dielectrically joined to a supported vinyl. Between a major edge of the cloth insert and the supported vinyl, there is juxtaposed an adhesive insert which, upon the dielectric operation, joins the supported vinyl to the underlying cloth insert, dielectric padding and backing material. The present invention provides a door panel which can be made in fewer steps and requires no subsequent trimming operation. At the same time, the inventive door panel causes the generation of less waste and provides an enhanced appearance.

DETAILED DESCRIPTION OF THE PREFERRED EMBODIMENT

Figure 1:
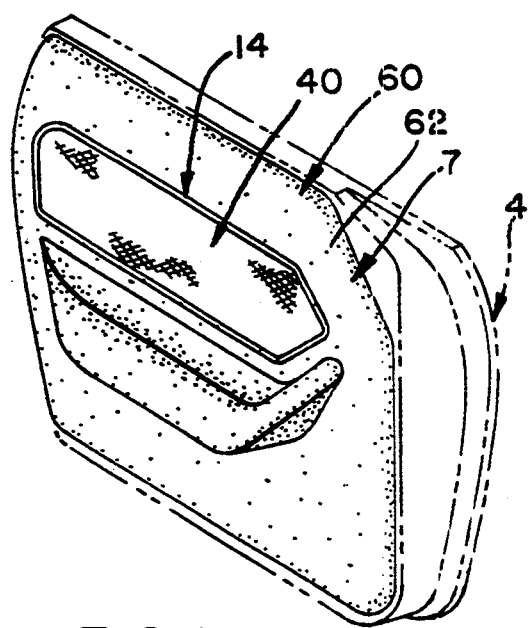
FIG. 1 is a perspective view of an interior vehicle door panel utilizing a preferred embodiment of the present invention.
Figure 2:
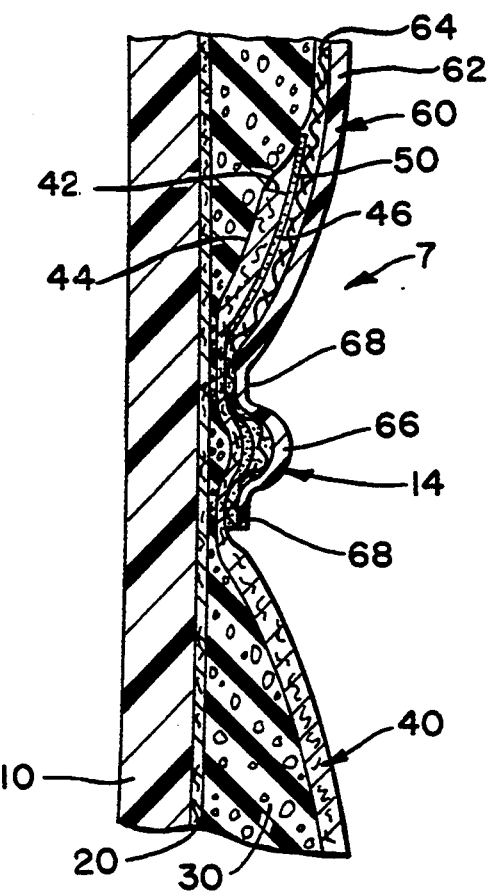
FIG. 2 is a magnified sectional view of a portion of the door panel shown in FIG. 1.
Figure 3:
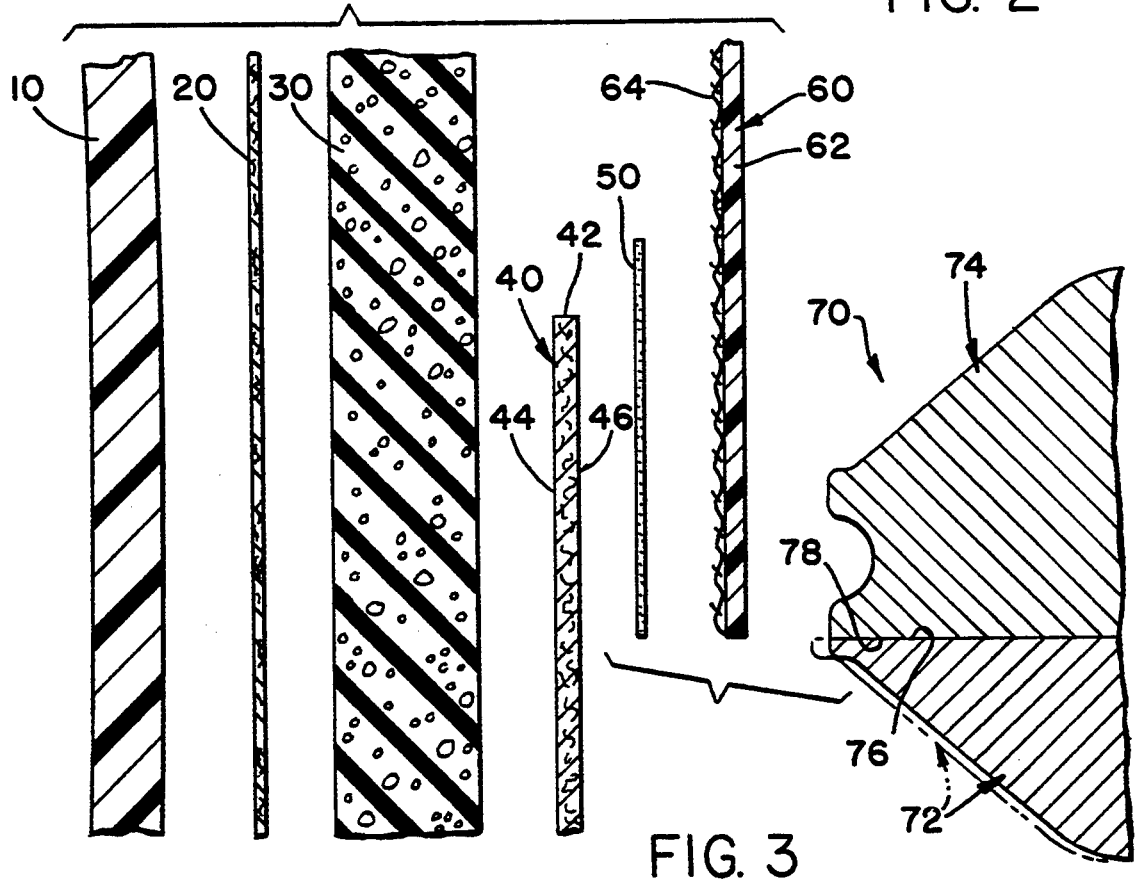
FIG. 3 is an exploded view of the door panel before the dielectric union of the door panel materials shown in FIGS. 1 and 2.

Referring to FIGS. 1 and 2, a vehicle door 4 with an interior vehicle door panel 7 has a generally rigid acrylonitrile-butadiene-styrene (ABS) panel member 10. The ABS panel 10 is a generally rigid member.

Attached to the ABS panel 10 by mechanical means such as staples or by a hot melt adhesive glue is a subfoundation dielectric board or paper 20. The paper 20 is a membrane backing material made from craft paper or other wood fiber paper material and is often called a 20 point subfoundation paper. The paper 20 is approximately 20 mils thick and has a three mil vinyl coating on a side edge opposite the, ABS panel 10.

Laid on top of the subfoundation paper 20 is a polyester fiber resin-impregnated pad 30. In the embodiment shown, the pad 30 is made by Sackner Company and is referred to as a dielectric embossing pad being approximately 360 mils thick.

Laid on top of the fiber pad 30 is a cloth membrane insert 40 which covers a portion of the pad 30. The cloth 40 has at least one major edge 42. The cloth is typically a polyester or nylon material and in the ,embodiment shown has a water-based latex carrier on its side 44 to stiffen the weave of the fabric. The stiffening of the weave of the fabric is to facilitate handling and trimming of the cloth and is not needed to enhance any dielectric properties of the cloth 40.

Placed on top of the cloth 40 adjacent its major edge 42 is an adhesive membrane insert 50. The adhesive insert 50 is a strip of nylon manufactured by the Nemus Corporation and as shown is three mils thick.

Covering the portion of the panel 10 not covered by the cloth 40 is a supported vinyl sheet 60. The vinyl 62 of the supported vinyl sheet is 15 mils thick with a three mil cotton or polyester backing 64. Experience has shown that a cotton backing gives a better bond. This material can be purchased from Textile Leather Corporation or B. F. Goodrich Corporation.

In operation, typically the paper 20 will be laid out in a pattern in the shape of the panel 10. Covering virtually all of the paper 20 will be the pad 30. Above that will be placed the cloth insert 40. As mentioned previously, the cloth insert major edge 42 will be covered by the nylon adhesive strip 50. The supported vinyl 60 will be overlaid on the major edge 42 of the cloth insert 40 as well as the remainder of the pad 30. The whole assembly will be placed on a dielectric tool 70 and into a dielectric press (not shown) which, in the example shown, gives the assembly a center hump 66 and two pressed down grooves 68 in design 14.

A floating dielectric fence blade 72 is designed into the dielectric tool 70. The supported vinyl strip 60 and nylon strip 50 are aligned against the fence blade 72 for perfect alignment, producing an aesthetically pleasing appearance. The fence blade 72 and floating locator pins (not shown) secure the nylon strip 50 and supported vinyl strip 60 for full dielectric blade coverage, assuring a positive adherence of the backing 64 and the nap (face) 46 of the cloth insert. The tool 70 specifications for the floating fence 72 indicate that the blade 72 must be flush with the bead blade 74 in the down position. Matching surfaces 76 and 78 of the blades 72, 74 must be left sharp. The sharp edges drive the raw edge ,of the supported vinyl 60 and bury it into the nap 46 of the cloth insert.

The action of the dielectric press will cause a charge of 3000 volts and approximately two amps (determined by the door size), causing the resin in the paper 20 and pad 30 to release and the nylon strip 50 to be melted at 313° F in the embossing sandwich, thereby bonding and forming the supported vinyl 60, cloth insert 40, pad 30 and paper 20 together. After the cooling process is complete, the assembly will be attached by gluing or stapling to the rigid plastic panel 10. No further trimming operations are required. The panel 7 will then be joined by some type of suitable fastener (not shown) to the vehicle door 4.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. An interior panel for an automotive vehicle comprising:
    a generally rigid plastic panel;
    a backing material formed into a membrane and attached with the rigid plastic panel;
    a polyester pad providing a cushioning surface, the pad being adjacent to the backing material opposite the plastic panel;
    a cloth membrane covering a portion of the pad, the cloth membrane having at least one major edge;
    an adhesive membrane placed on the cloth membrane generally adjacent the major edge;
    a supported vinyl membrane covering a portion of the pad not covered by the cloth membrane, the vinyl membrane having a portion overlapping the adhesive membrane and the cloth membrane, the backing material, the pad, the cloth membrane, the adhesive membrane and the vinyl membrane being dielectrically joined to one another adjacent the major edge of the cloth membrane 2. An interior panel for an automotive vehicle door comprising:
    a generally rigid plastic panel;
    a paper backing material formed into a membrane and attached with the rigid plastic panel;
    a polyester fiber pad providing a cushioning surface, the pad being adjacent to the backing material opposite the plastic panel;
    a cloth membrane covering a portion of the pad, the cloth membrane having at last one major edge;
    a nylon adhesive membrane placed on the cloth membrane generally adjacent the major edge; and
    a vinyl membrane supported by a cloth fabric covering a portion of the pad not covered by the cloth membrane, the vinyl membrane having a portion overlapping the adhesive membrane and the cloth membrane, the vinyl membrane, the cloth membrane, the backing material, the pad, the cloth membrane and the vinyl membrane being dielectrically joined to one another adjacent the major edge of the cloth membrane.

\* \* \* \* \*